United States Patent
Mihelic (10) Patent No.: US 8,170,965 B2
(45) Date of Patent: May 1, 2012

(54) METHOD FOR GOVERNING THE OPERATION OF A GENERALIST AGENT WITHIN A COMPLEX MULTI-AGENT ADAPTIVE SYSTEM

(76) Inventor: Fabian Matthew Mihelic, Knoxville, TN (US)

( * ) Notice: Subject to any disclaimer, the term of this patent is extended or adjusted under 35 U.S.C. 154(b) by 940 days.

(21) Appl. No.: 12/046,781

(22) Filed: Mar. 12, 2008

(65) Prior Publication Data

US 2009/0234786 A1    Sep. 17, 2009

(51) Int. Cl.
*G06F 15/18* (2006.01)
*G06E 1/00* (2006.01)

(52) U.S. Cl. .............................. 706/14; 379/85; 709/206
(58) Field of Classification Search ..................... 706/14
See application file for complete search history.

(56) References Cited

U.S. PATENT DOCUMENTS

| | | | |
|---|---|---|---|
| 6,088,804 A | 7/2000 | Hill et al. | |
| 6,108,616 A | 8/2000 | Borchers et al. | |
| 6,741,974 B1 | 5/2004 | Harrison et al. | |
| 6,882,988 B2 | 4/2005 | Subbu et al. | |
| 7,058,968 B2 | 6/2006 | Rowland et al. | |
| 7,072,883 B2 | 7/2006 | Potok et al. | |
| 7,089,217 B2 | 8/2006 | Kasabov | |
| 7,096,498 B2 | 8/2006 | Judge | |
| 2006/0072505 A1* | 4/2006 | Carrillo et al. | ................ 370/331 |
| 2006/0167917 A1 | 7/2006 | Solomon | |
| 2006/0272020 A1* | 11/2006 | Gardner | ......................... 726/23 |

* cited by examiner

*Primary Examiner* — Omar Fernandez Rivas
*Assistant Examiner* — Kalpana Bharadwaj
(74) *Attorney, Agent, or Firm* — Pitts & Lake, P.C.

(57) ABSTRACT

Described is a method for governing the operation of a generalist agent within a multi-agent complex adaptive system such that the generalist agent maintains the stability of the system. The method includes the steps of migrating about the system, badging with the specialty agents, participating in the respective function performed by the specialty agents, collecting information while functionally participating as a specialty agent, evaluating the collected information, reconfiguring source code in view of the evaluated information, testing the reconfigured source code through additional functional participation, determining the usefulness of the reconfigured source code, archiving any reconfigured source code determined to be useful, and distributing the useful reconfigured source code.

18 Claims, 4 Drawing Sheets

METHOD FOR GOVERNING THE OPERATION OF A GENERALIST AGENT WITHIN A COMPLEX MULTI-AGENT ADAPTIVE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention pertains to a method for governing the operation of a generalist agent within a multi-agent complex adaptive system. More particularly, this invention pertains to a method for governing the operation of a generalist agent such that the generalist agent maintains the stability of the multi-agent complex adaptive system.

2. Description of the Related Art

U.S. Pat. No. 7,058,968, issued to Rowland et al., teaches a system for providing system security and resource management. The system includes "autonomous software programs that can patrol a communications network independent of the clients they are monitoring". Additionally, the autonomous software programs "are capable of performing any type of system operation permitted on the client". Ultimately, the autonomous software programs "administer and control all aspects of the networking environment and . . . lead to a self-healing network architecture that can sustain itself with minimal human interaction". However, this system is limited in that the autonomous software programs are centrally managed and deployed, and the autonomous software programs report back to a central authority. Similarly, U.S. Pat. No. 6,108,616, issued to Borchers et al., teaches a multi-agent system having a plurality of autonomous diagnostic agents that report to a central process control system. Having autonomous agents that must report to a central authority limits a system because all discoveries, decisions, and actions by the autonomous agents must be actuated by the central authority such that the central authority can become overwhelmed to the extent that the system becomes unstable and potentially fails. This is especially a concern for complex systems managing large quantities of information.

U.S. Pat. No. 6,882,988, issued to Subbu et al., teaches an architecture having a plurality of coevolutionary agents for performing local operations at their respective nodes and generating solutions based on information gathered during the operations. However, this architecture is limited in that the coevolutionary agents are stationary, that is, they remain at their respective nodes. Consequently, to share the gathered information, the architecture must include additional mobile agents for carrying the information gathered by a coevolutionary agent to another coevolutionary agent at another node.

Consequently, a method for governing the operation of an agent within a multi-agent complex adaptive system that permits the agent to perform local operations, move about the system, and operate without being required to communicate with a central authority is desired.

BRIEF SUMMARY OF THE INVENTION

In accordance with the various features of the present invention there is provided a method for governing the operation of a generalist agent within a multi-agent complex adaptive system such that the generalist agent maintains the stability of the system. The multi-agent system includes at least one generalist agent and at least one specialty agent. Each generalist agent and each specialty agent include an identical source code for instructing the agents to accomplish a source code concept. The generalist agents have access to more of the source code than do the specialty agents such that the generalist agents are capable of executing more functions than the specialty agents. The method of the present invention instructs the generalist agents to migrate about the system, to badge with the specialty agents, to participate in the function performed by the specialty agents, to collect information while functionally participating as a specialty agent, to evaluate the collected information, to reconfigure its own source code in view of the evaluated information, to test the reconfigured source code through additional functional participation, to determine the usefulness of the reconfigured source code, to archive any reconfigured source code determined to be useful, and to distribute the useful reconfigured source code to other generalist agents and to the specialty agents.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention provides a method for governing the operation of a generalist agent within a multi-agent complex adaptive system such that the generalist agent maintains the stability of the system. The multi-agent system includes at least one generalist agent and at least one specialty agent, each agent of the system including a source code for instructing the agents to accomplish the source code concept. The generalist agents migrate about the system, badge with the specialty agents, participate in the respective function performed by the specialty agents, collect information while functionally participating as a specialty agent, evaluate the collected information, reconfigure their own source code in view of the evaluated information, test the reconfigured source code through additional functional participation, determine the usefulness of the reconfigured source code, archive any reconfigured source code determined to be useful, and distribute the useful reconfigured source code to other generalist agents and to the specialty agents. One embodiment of the method for governing the operation of a generalist agent within a multi-agent complex adaptive system in accordance with the various features of the present invention is depicted as a flow diagram at 10 in FIG. 1.

Figure 1:
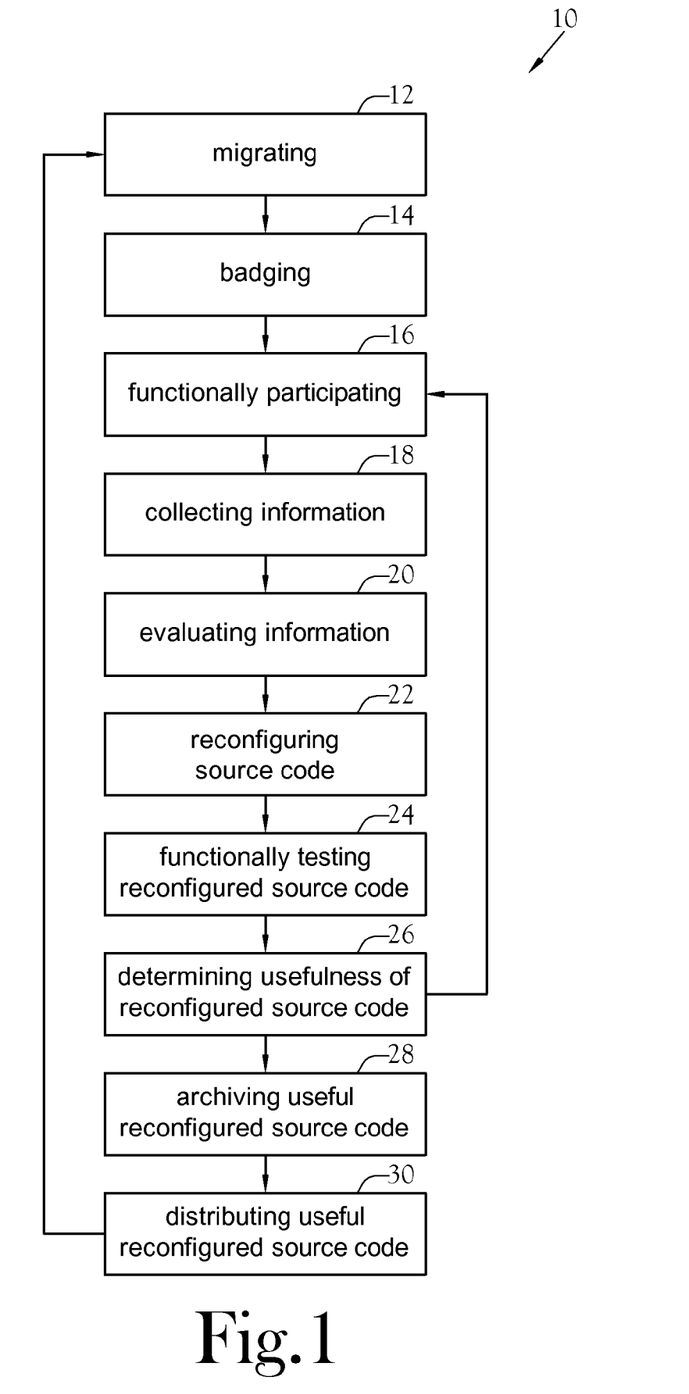
FIG. 1 is a flow diagram illustrating one embodiment of the method for governing the operation of a generalist agent within a multi-agent complex adaptive system.

In the illustrated embodiment, the method for governing the operation of a generalist agent within a multi-agent complex adaptive system 10 includes the steps of migrating 12, badging 14, functionally participating 16, collecting information 18, evaluating information 20, reconfiguring source code 22, functionally testing reconfigured source code 24, determining usefulness of reconfigured source code 26, archiving useful reconfigured source code 28, and distributing useful reconfigured source code 30. The multi-agent complex adaptive system includes at least one generalist agent and at least one specialty agent. Typically, the system includes a plurality of generalist agents and a plurality of specialty agents. Each generalist agent and each specialty agent include a source code in its entirety. The source code inherently includes a source code concept or an attractor, which defines the overall purpose of the system. Generally, the source code is an array of information that includes various executable functions and instructions. The execution of the various functions and instructions accomplish the source code concept. Consequently, the source code directs the generalist agents and the specialty agents to accomplish the source code concept. The generalist agents and the specialty agents can be any thing capable of executing the source code. For example, the agents can be computers in communication by way of a network without departing from the scope or spirit of the present invention. Additionally, the agents can be portions of a larger code such that the agents are intangible.

Although each specialty agent includes the entire source code, each specialty agent has access to only a portion of the source code. Stated differently, a portion or portions of the source code for a specialty agent is blocked, and the remainder is unblocked. A specialty agent has access to only the unblocked portions of the source code such that the agent can execute only the functions defined within the unblocked portions of the source code. The source code of each specialty agent is blocked such that the specialty agent is limited to executing a single function or instruction or, in certain circumstances, a limited plurality of functions or instructions. The specialty agents have respective portions of their source code blocked such that each specialty agent executes a respective function or instruction provided by the source code to the extent that when the specialty agents collectively execute their respective functions or instructions, the source code concept is accomplished. It should be noted that the blocking and unblocking of source code within an agent is a reversible process that is subsequently discussed.

As discussed above, the generalist agents include the same source code included by the specialty agents. However, the generalist agents have access to a larger portion of the source code than do the specialty agents. Stated differently, the generalist agents have less of their respective source codes blocked. Consequently, the generalist agents are capable of executing multiple functions defined by the source code. Stated differently, each generalist agent is capable executing the functions of a plurality of specialty agents. Accordingly, the method 10 of the present invention instructs the generalist agents to migrate about the system, as depicted at 12 in FIG. 1. When a generalist agent migrates about the system, the generalist agent systematically or randomly migrates among and comes in contact with the specialty agents. When a generalist agent comes in contact with a particular specialty agent, the generalist agent exhibits to the specialty agent that the generalist agent includes an unblocked portion of the source code that is consistent with the unblocked portion of the source code included by the particular specialty agent. Stated differently, the generalist agent exhibits to the specialty agent that the generalist agent is capable of executing the function executed by the specialty agent. This process of exhibition is referred to as badging and is depicted at 14 in FIG. 1.

After badging with the specialty agent, the generalist agent functionally participates as the specialty agent, as depicted at 16 in FIG. 1. Stated differently, the generalist agent executes the function executed by the specialty agent. While functionally participating, the generalist agent collects information relating to the execution of the function, as depicted at 18 in FIG. 1. By collecting information while functionally participating, the generalist agent is able to collect information that exists only dynamically for the specialty agent and that would not otherwise be obtainable. After collecting the information, the generalist agent evaluates the information, as depicted at 20 in FIG. 1. The generalist agent evaluates the information by comparing the collected information against the source code for analogous correlations. In comparing the information against the source code, the generalist agent detects data that is relevant with respect to the source code concept.

Figure 2:
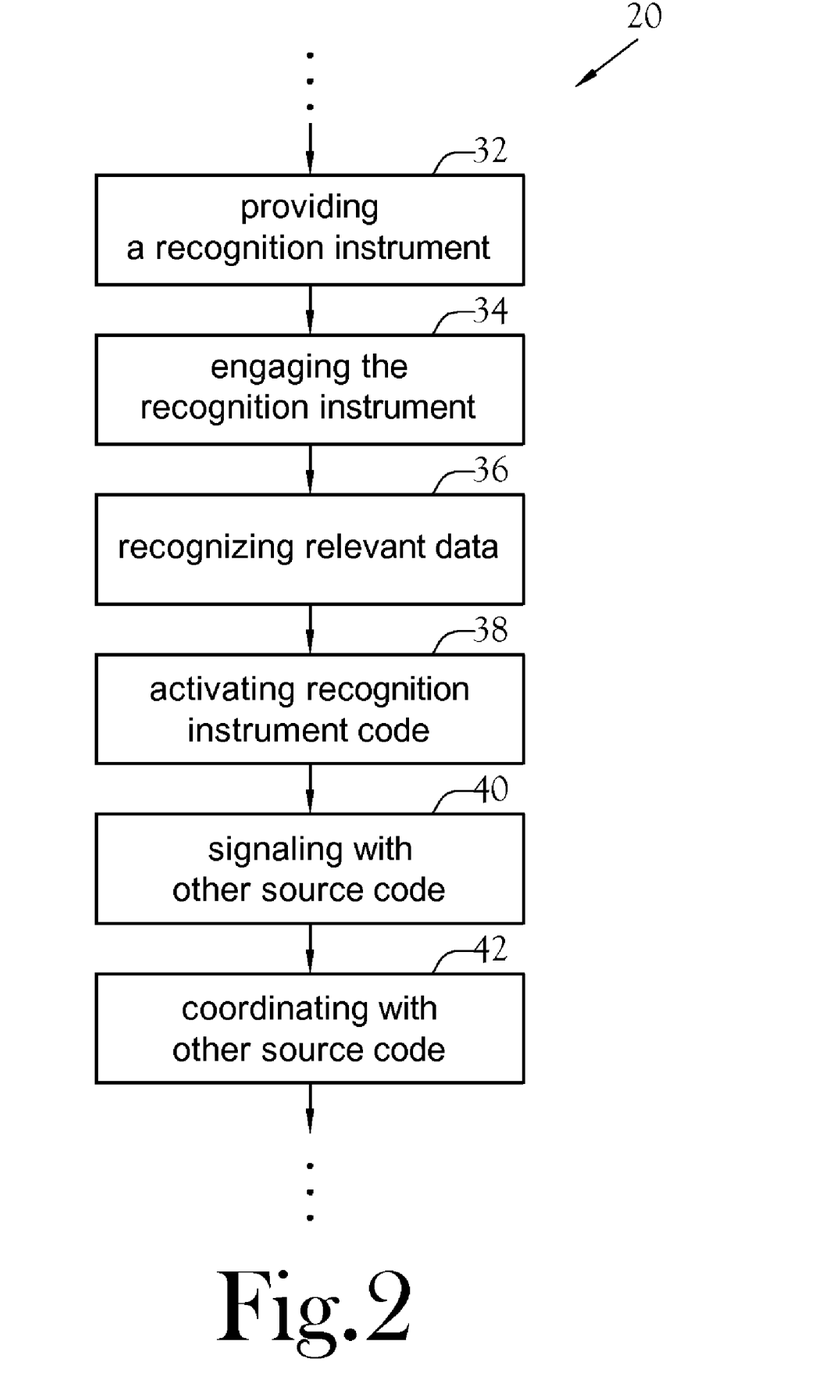
FIG. 2 is a flow diagram illustrating one embodiment of the step of evaluating information of FIG. 1.

FIG. 2 is a flow diagram illustrating one embodiment of a more detailed look at the step of evaluating information 20. In the illustrated embodiment, the step of evaluating 20 includes the steps of providing for a recognition instrument 32, engaging the recognition instrument 34, recognizing relevant data 36, activating the recognition instrument code 38, signaling with the source code 40, and coordinating with the source code 42. The step of providing for a recognition instrument 32 includes equipping the source code with a function for detecting data that is relevant to the source code concept. The step of engaging the recognition instrument 34 includes accessing the function within the source code for detecting the relevant data. The step of recognizing relevant data 36 includes executing the function for detecting relevant data such that any relevant data is recognized. The step of activating the recognition instrument code 38 includes executing the function for detecting relevant data such that the detection of any relevant data is indicated. The step of signaling with the source code 40 includes establishing communication between the function for detecting relevant data in the source code. And the step of coordinating with the source code 42 includes communicating to the source code whether the function for detecting data relevant to the source code concept recognized any relevant data.

Considering again FIG. 1, after the generalist agent evaluates the collected information, the generalist agent reconfigures its source code in view of the evaluated information, as depicted at 22 of FIG. 1. The generalist agent reconfigures its source code by blocking and/or unblocking particular portions of its source code. Stated differently, reconfiguring the source code does not include changing the actual code but is a matter of altering the accessibility of particular portions of the source code for a given agent. After reconfiguring its source code, the generalist agent functionally tests the reconfigured source code, as depicted at 24. More specifically, the generalist agent again functionally participates as the specialty agent but using the reconfigured source code. While functionally participating, the generalist agent assesses the reconfigured source code for functional efficacy. Stated differently, the step of functionally testing reconfigured source code 24 includes collecting additional information, similar to the step of collecting information depicted at 18, evaluating the additionally collected information, similar to the step of evaluating information depicted at 20, and reconfiguring its source code accordingly, similar to the step of reconfiguring source code depicted at 22.

After the reconfigured source code is functionally tested, the efficacy of the reconfigured source code is assessed, and the generalist agent determines whether the reconfigured source code is useful with respect to the source code concept, as depicted at 26. When the reconfigured source code is determined to not be useful, the generalist agent returns to the step of functionally participating 16. When the reconfigured source code is determined to be useful, the generalist agent can return to the step of functionally participating 16 to further reconfigure its source code. Whether or not the generalist agent returns to the step of functionally participating 16 to further reconfigure its source code, the generalist agent archives the useful reconfigured source code, as depicted at 28. The generalist agent can archive the reconfigured source code within the source code itself or outside the source code. Useful reconfigured source code is distributed by the generalist agent to the specialty agents and/or other generalist agents, as depicted at 30. Distribution of the reconfigured source code is accomplished through the generalist agent contacting specialty agents and/or other generalist agents and blocking and/or unblocking the respective source codes in accordance with the generalist agent's reconfigured source code. Distribution is also accomplished through the generalist agent initiating new specialty agents and incorporating the reconfigured source code therein. Distribution is further accomplished when the generalist agent contacts another generalist agent and blocks and/or unblocks the other generalist agent's source in accordance with the reconfigured source code, and the other generalist agent distributes the reconfigured source code in accordance with the above discussion.

After the generalist agent initiates the distribution of the reconfigured source code, it again migrates about the system, as depicted at 12 in FIG. 1. It should be noted that the generalist agents are not centrally dispatched and do not report to a central or base authority. Instead the generalist agents make decisions in accordance with the source code concept at the site of the specialty agents and cause the specialty agents to adapt accordingly. Additionally, there is no hierarchy among the generalist agents such that each generalist agent is adapted to make decisions regarding all levels of the source code. Accordingly, the method 10 of the present invention decentralizes the decision-making performed by the system such that the system is capable of efficiently adapting to prevent instability relating to the execution of the source code concept, which ultimately leads to system failure.

Figure 3A:
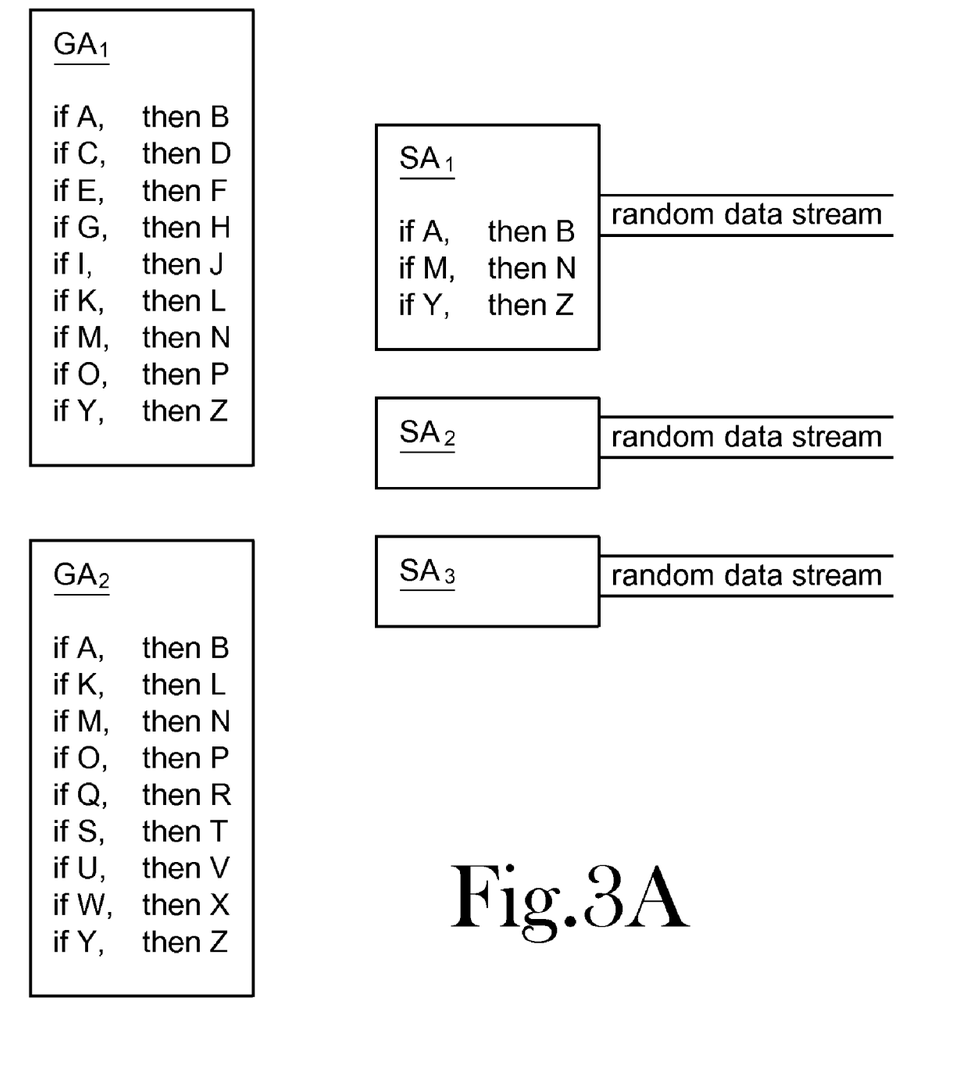
FIG. 3A illustrates one embodiment of a multi-agent complex adaptive system.
Figure 3B:
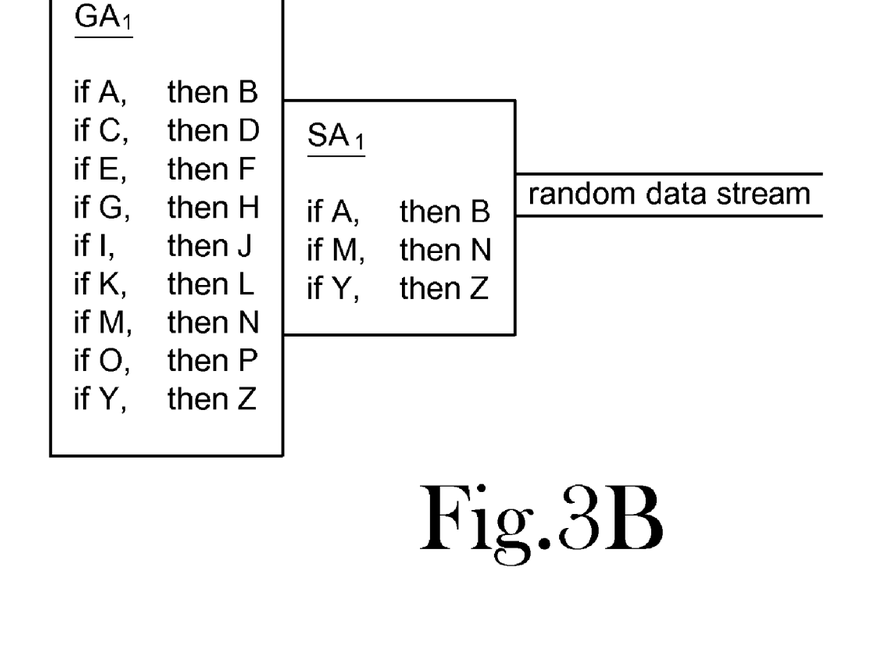
FIG. 3B illustrates a generalist agent badging with a specialty agent in accordance with the method of FIG. 1.
Figure 3C:
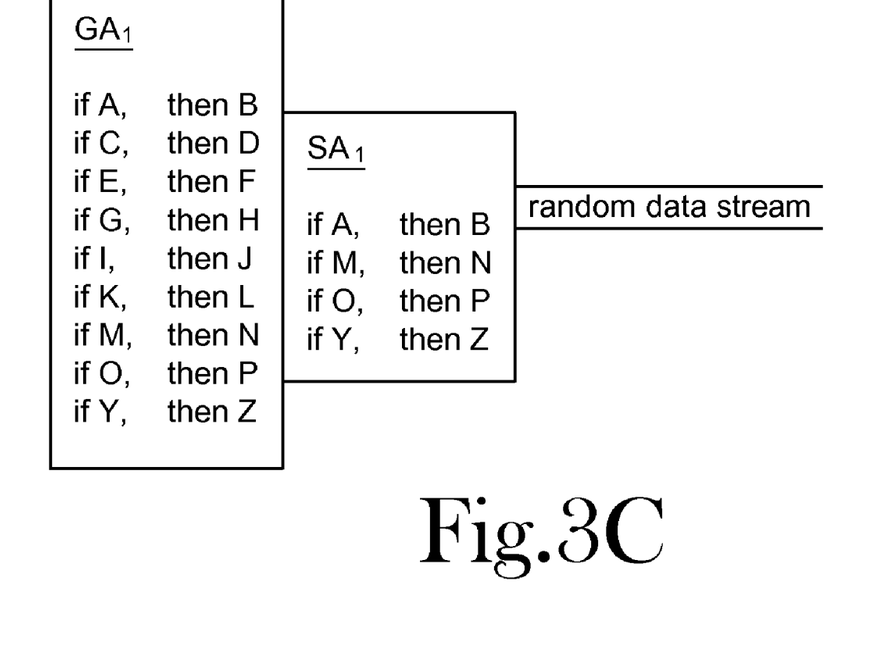
FIG. 3C illustrates a specialty agent of FIG. 3A having a reconfigured source code in accordance with method of FIG. 1.

FIGS. 3A-3C illustrate an exemplary implementation of the method for governing the operation of a generalist agent within a multi-agent complex adaptive system 10 in accordance with the various features of the present invention. In the illustrated example, the source code concept relates to data acquisition. More specifically, the source code concept includes searching for specific pieces of data occurring in a specific order among a massive stream of seemingly random data. The specific pieces of data are represented by the following lower-case letters and the specific order is the following order in which they are presented: c, e, g, i, k, m, o, q, s, u, and w. The source code concept also includes acquiring the desired sequence of data and grouping the acquired data for further processing. In the illustrated example, the source code includes a listing of "if-then" statements. More specifically, the source code includes the following "if-then" statements:

if A, then B;
if C, then D;
if E, then F;
if G, then H;
if I, then J;
if K, then L;
if M, then N;
if O, then P;
if Q, then R;
if S, then T;
if U, then V;
if W, then X;
if Y, then Z.

When executed, function A initiates the execution of the remainder of the above-listed source code. In accordance with the source code, when function A is executed, function B is executed. Function B instructs the corresponding agent to begin searching for the specific pieces of data in the specific order. More specifically, function B initiates the execution of function C, which instructs the corresponding agent to search for and acquire the specific piece of data represented by the letter c. If function C is fully executed, that is, the specific piece of data represented by the letter c is searched for and acquired, function D is executed. Function D initiates the execution of function E. Function E instructs the corresponding agent to consider the piece of data in the massive stream of seemingly random data that immediately follows the acquired piece of data represented by the letter c, determine whether the piece of data is the specific piece of data represented by the letter e, and, if it is, acquire the specific piece of data. If function E is fully executed, that is, the specific piece of data represented by the letter e is searched for and acquired, function F is executed. Function F initiates the execution of function G. Function G instructs the corresponding agent to consider the piece of data in the massive stream of seemingly random data that immediately follows the acquired piece of data represented by the letter e, determine whether the piece of data is the specific piece of data represented by the letter g, and, if it is, acquire the specific piece of data. If function G is fully executed, that is, the specific piece of data represented by the letter g is searched for and acquired, function H is executed. Considering the above discussion, functions I, K, M, O, Q, S, U, and W instruct the corresponding agent to search for and acquire the specific pieces of data i, k, m, o, q, s, u, and w, respectively, in the same manner as do functions C, E, and G. Additionally, functions H, J, L, N, P, R, T, and V progress the execution of the source code such that the source code concept is accomplished in the same manner as do functions D and F.

If function W is fully executed, that is, the specific piece of data represented by the letter w is searched for and acquired, function X is executed. Function X instructs the corresponding agent to execute function Y, which instructs the agent to stop searching for and acquiring the specific pieces of data. It should be noted that if function Y is executed, the source code concept has been accomplished. In accordance with the above-discussed source code, if function Y is executed, function Z is executed, which instructs the agent to group the acquired pieces of data for further processing.

The above-discussion of the exemplary source code is based on an agent having its entire source code unblocked. However, as discussed above, a given specialty agent does not have, at least initially, its source code entirely unblocked. This permits the specialty agents of the system to operate more efficiently. For example, FIG. 3A illustrates a system having three specialty agents, namely $SA_1$, $SA_2$, and $SA_3$. Initially, as illustrated at FIG. 3A, the source code of $SA_1$ is blocked such that $SA_1$ is dedicated to searching for and acquiring the specific piece of data represented by the letter m. It should be noted that the exemplary source code associated with the example of the present invention illustrated at FIGS. 3A-3C is such that when a portion of the source code is blocked, the full execution of the unblocked portion of the source code is not interrupted. More specifically, functions B, D, F, H, J, L, N, P, R, T, V, and X progress the execution of the source to next unblocked function. Additionally, the portion of the source code including the "if A, then B" statement and the "if Y, then Z" statement is unblocked for all agents because these statements initiate and terminate the execution of the source code as a whole. Consequently, considering the source code of $SA_1$, the execution of function B initiates the execution of function M, and the execution of function N initiates the execution of function Y.

In the illustrated embodiment of FIG. 3A, the system includes two generalist agents, namely $GA_1$ and $GA_2$. The source code of $GA_1$ is blocked such that $GA_1$ is adapted to search for and acquire the specific pieces of data represented by the letters c, e, g, i, k, m, and o. The source code of $GA_2$ is blocked such that $GA_2$ is adapted to search for and acquire the specific pieces of data represented by the letters k, m, o, q, s, u, and w. In accordance with the method 10 illustrated at FIG. 1, $GA_1$ and $GA_2$ migrate 12 about the system and come in contact with $SA_1$, $SA_2$, and/or $SA_3$ such that $GA_1$ and $GA_2$ badge 14 with $SA_1$, $SA_2$, and/or $SA_3$.

FIG. 3B illustrates $GA_1$ badging 14 with $SA_1$. In accordance with the above discussion, when badging 14, $GA_1$ exhibits to $SA_1$ that $GA_1$ is capable of executing the function executed by $SA_1$, namely that $GA_1$ is capable of searching for and acquiring the specific piece of data represented by the letter m. After $GA_1$ has badged 14 with $SA_1$, $GA_1$ functionally participates 16 in searching for and acquiring the specific piece of data represented by the letter m. In accordance with the method 10 illustrated at FIG. 1, while functionally participating 16, $GA_1$ collects information 18 relating to the function of searching for and acquiring the specific piece of information represented by the letter m. More specifically, $GA_1$ determines whether the specific piece of data represented by the letter m is being acquired from the massive stream of seemingly random data. Next, $GA_1$ evaluates the collected information 20. More specifically, $GA_1$ determines that if the specific piece of data represented by the letter m is being acquired from the massive stream of seemingly random data, the entire sequence of specific pieces of data may be acquired from the data stream. Consequently, $GA_1$ reconfigures its source code 22 to use the statement "if O, then P" such that $GA_1$ searches for and acquires the subsequent specific piece of data in the desired sequence, namely the specific piece of data represented by the letter o.

In accordance with the method 10 illustrated at FIG. 1, after reconfiguring its source code, $GA_1$ functionally tests the reconfigured source code 24. More specifically, $GA_1$ functionally participates using the reconfigured source code and collects information relating to the function of searching for and acquiring the specific pieces of information represented by the letters m and o. Even more specifically, $GA_1$ determines whether $SA_1$ would be sequentially acquiring the specific pieces of data represented by the letters m and o from the massive stream of seemingly random data. Next, $GA_1$ determines the usefulness of the reconfigured source code 26. More specifically, if the specific pieces of data represented by the letters m and o are being sequentially acquired, $GA_1$ determines that the entire sequence of specific pieces of data may be acquired from the massive stream of seemingly random data and that the reconfiguration is useful. When $GA_1$ determines that the reconfigured source code is useful, $GA_1$ can return to the step of functionally participating 16, which potentially leads to another reconfiguration of the source code.

Also in accordance with the method 10 illustrated at FIG. 1, $GA_1$ archives the useful reconfigured source code 28 and distributes the useful reconfigured source code 30. FIG. 3C illustrates $SA_1$ having a reconfigured source code due to distribution. In accordance with above discussion, $GA_1$ can reconfigure $SA_1$'s source code to the extent that $SA_1$ sequentially searches for and acquires the specific pieces of data represented by the letters c, e, g, i, k, m, and o. Because the entire source code of $GA_1$ is not unblocked, $GA_1$ is unable to reconfigure the source code of $SA_1$ to search for and acquire the entire desired sequence of data. However, considering $GA_2$'s unblocked source code, $GA_2$ is able to further reconfigure $SA_1$'s already reconfigured source code such that $SA_1$ searches for and acquires the entire desired sequence of data.

Considering the above-discussed system illustrated at FIGS. 3A-3C, it can be seen that a system not implementing the method 10 of the present invention is prone to instability. More specifically, a system not implementing the method 10 of present invention would have to either provide an agent having an entirely unblocked source code at every data stream interface or have a pyramid of specialty agents with varying degrees of unblocked source code. If the system has an agent having an entirely unblocked source code at every data stream interface, the system would operate so inefficiently that the system would be unable to handle the massive amounts of data of the stream of seemingly random data, resulting in a risk of the specific pieces of data being undetected or a complete entropy of the system. If the system has a pyramid of specialty agents having varying degrees of unblocked source code, that is, if the system has successive levels of unblocked code such that each level has more unblocked code, processing the data would take an unnecessarily large amount of time because the acquired data would have to travel up and down the pyramid of specialty agents.

Although the method for governing the operation of a generalist agent within a multi-agent complex adaptive system 10 has been discussed in terms of data acquisition, it should be noted that the method 10 has application in other systems, such as data organization systems, data coordination systems, computer integration systems, biological systems, and any other multi-agent complex adaptive system, without departing from the scope or spirit of the present invention.

From the foregoing description, those skilled in the art will recognize that a method for governing the operation of a generalist agent within a multi-agent complex adaptive system offering advantages over the prior art has been provided. The multi-agent system includes at least one generalist agent and at least one specialty agent, each agent of the system including a source code for instructing the agents to accomplish the source code concept. The generalist agents migrate about the system, badge with the specialty agents, participate in the respective function performed by the specialty agents, collect information while functionally participating as a specialty agent, evaluate the collected information, reconfigure their own source code in view of the evaluated information, test the reconfigured source code through additional functional participation, determine the usefulness of the reconfigured source code, archive any reconfigured source code determined to be useful, and distribute the useful reconfigured source code to other generalist agents and to the specialty agents.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and

Having thus described the aforementioned invention, what is claimed is:

1. A method for governing the operation of a generalist agent within a multi-agent adaptive system, the generalist agent having a source code, said method comprising the steps of:
    migrating about the multi-agent adaptive system and contacting a specialty agent, the specialty agent having the source code;
    badging with the specialty agent;
    functionally participating as the specialty agent;
    collecting information relating to a function of the specialty agent while performing said step of functionally participating;
    evaluating the information collected at said step of collecting information;
    reconfiguring the source code of the generalist agent by blocking and unblocking the source code of the generalist agent in view of the evaluated information;
    functionally testing the reconfigured source code to determine the efficacy of the reconfigured source code as it relates to the source code concept;
    archiving the reconfigured source code; and
    distributing the reconfigured source code.

2. The method of claim 1 wherein said step of badging includes exhibiting to the specialty agent that the source code of the generalist agent is unblocked such that the generalist agent is capable of functioning as the specialty agent.

3. The method of claim 1 wherein said step of evaluating includes analyzing the collected information against the source code.

4. The method of claim 1 wherein said step of functionally testing includes performing the function of the specialty agent using the reconfigured source code.

5. The method of claim 1 wherein said step of archiving is performed after the reconfigured source code is determined to be efficient as it relates to the source code concept.

6. The method of claim 1 wherein said step of distributing includes reconfiguring the source code of the specialty agent in accordance with the archived source code.

7. The method of claim 1 wherein said step of distributing includes reconfiguring the source code of another generalist agent in accordance with the archived source code.

8. The method of claim 1 wherein said step of distributing includes distributing the reconfigured source code to the specialty agent or to another generalist agent.

9. The method of claim 1 wherein the source code relates to data acquisition.

10. The method of claim 1 wherein the source code relates to data organization.

11. The method of claim 1 wherein the source code relates to data coordination.

12. The method of claim 1 wherein the source code relates to computer integration.

13. The method of claim 1 wherein the source code relates to human organization.

14. The method of claim 1 wherein the source code relates to biological systems.

15. A method for governing the operation of a generalist agent within a multi-agent adaptive system, said method comprising the steps of:
    providing at least one generalist agent and at least one specialty agent, the at least one generalist agent including the entirety of a source code and having a portion of the source code blocked and a portion of the source code unblocked, the at least one specialty agent including the entirety of the source code and having a portion of the source code blocked and a portion of the source code unblocked, the respective unblocked portions of the source code govern the function of the at least one generalist agent and the at least one specialty agent, the at least one generalist agent performs the steps of:
    migrating throughout the multi-agent adaptive system and contacting at least one of the at least one specialty agents;
    badging with the at least one specialty agent contacted by the at least one generalist agent, said step of badging includes exhibiting to the at least one specialty agent that the source code of the at least one generalist agent is unblocked such that the at least one generalist agent is capable of functioning as the at least one specialty agent;
    functionally participating as the at least one specialty agent badged by the at least one generalist agent;
    collecting information relating to the function of the at least one specialty agent while performing said step of functionally participating;
    evaluating the information collected at said step of collecting information, said step of evaluating includes analyzing the collected information against the source code;
    reconfiguring the source code of the at least one generalist agent, said step of reconfiguring includes blocking and unblocking the source code of the at least one generalist agent in view of the evaluated information;
    functionally testing the reconfigured source code, said step of functionally testing includes performing the function of the at least one specialty agent using the reconfigured source code;
    determining the efficacy of the reconfigured source code as it relates to the source code concept;
    archiving the reconfigured source code when the reconfigured source code is determined to be efficient as it relates to the source code concept; and
    distributing the archived source code to at least one of the at least one specialty agent or to another of the at least one generalist agent, said step of distributing includes reconfiguring the source code of at least one of the at least one specialty agent in accordance with the archived source code or reconfiguring the source code of another of the at least one generalist agent in accordance with the archived source code.

16. A method for governing the operation of a generalist agent within a multi-agent adaptive system, said method comprising the steps of:
    migrating about the multi-agent adaptive system and contacting a specialty agent having the source code;
    badging with the specialty agent;
    functionally participating as the specialty agent;
    collecting information relating to a function of the specialty agent while performing said step of functionally participating;
    evaluating the information collected at said step of collecting information;
    reconfiguring the source code of said generalist agent in view of the evaluated information;
    functionally testing the reconfigured source code to determine the efficacy of the reconfigured source code as it relates to the source code concept;
    archiving the reconfigured source code; and
    distributing the reconfigured source code by reconfiguring the source code of the specialty agent in accordance with the archived source code.

17. The method of claim 16, wherein said step of distributing the reconfigured source code includes reconfiguring the source code of another generalist agent in accordance with the archived source code.

18. A method for governing the operation of a generalist agent within a multi-agent adaptive system, said method comprising the steps of:
- migrating about the multi-agent adaptive system and contacting a specialty agent having the source code;
- badging with the specialty agent;
- functionally participating as the specialty agent;
- collecting information relating to a function of the specialty agent while performing said step of functionally participating;
- evaluating the information collected at said step of collecting information;
- reconfiguring the source code of said generalist agent in view of the evaluated information;
- functionally testing the reconfigured source code to determine the efficacy of the reconfigured source code as it relates to the source code concept;
- archiving the reconfigured source code; and
- distributing the reconfigured source code by reconfiguring the source code of another generalist agent in accordance with the archived source code.

* * * * *